United States Patent [19]

Reuter

[11] Patent Number: 5,065,632

[45] Date of Patent: Nov. 19, 1991

[54] FLOW LINE WEIGHING DEVICE

[76] Inventor: Peter A. Reuter, 38 Honeysuckle Dr., Hope Valley, South Australia, Australia

[21] Appl. No.: 458,663

[22] PCT Filed: Aug. 4, 1988

[86] PCT No.: PCT/AU88/00288
§ 371 Date: Jan. 23, 1990
§ 102(e) Date: Jan. 23, 1990

[87] PCT Pub. No.: WO89/01133
PCT Pub. Date: Feb. 9, 1989

[30] Foreign Application Priority Data

Aug. 4, 1987 [AU] Australia .................. PI3518

[51] Int. Cl.$^5$ .............................. G01F 1/30
[52] U.S. Cl. ................................. 73/861.73
[58] Field of Search ............ 73/861.72, 861.73, 861.74

[56] References Cited

U.S. PATENT DOCUMENTS

| 2,805,574 | 9/1957 | Jackson, Jr. et al. ............ 73/861.74 |
| 3,640,135 | 2/1972 | Tomiyasu et al. . |
| 4,063,456 | 12/1977 | Jonkers . |
| 4,069,709 | 1/1978 | Volk et al. . |
| 4,157,661 | 1/1979 | Schindel .......................... 73/861.73 |
| 4,440,029 | 4/1984 | Tomiyasu et al. . |

Primary Examiner—Herbert Goldstein
Attorney, Agent, or Firm—Kinzer, Plyer, Dorn, McEachran & Jambor

[57] ABSTRACT

A flow line weighing device for weighing material flowing over a plate. The plate has one or more force transducers mounted on the plate so that the plate is directly and solely supported by the transducer or transducers. The output signal, or additive signal, of the transducer or transducers, respectively, is processed to give a readout which is independent of the area of the plate. Thus a direct reading is obtained without the requirement of the mechanical transmission of a force to the sensing units.

7 Claims, 7 Drawing Sheets

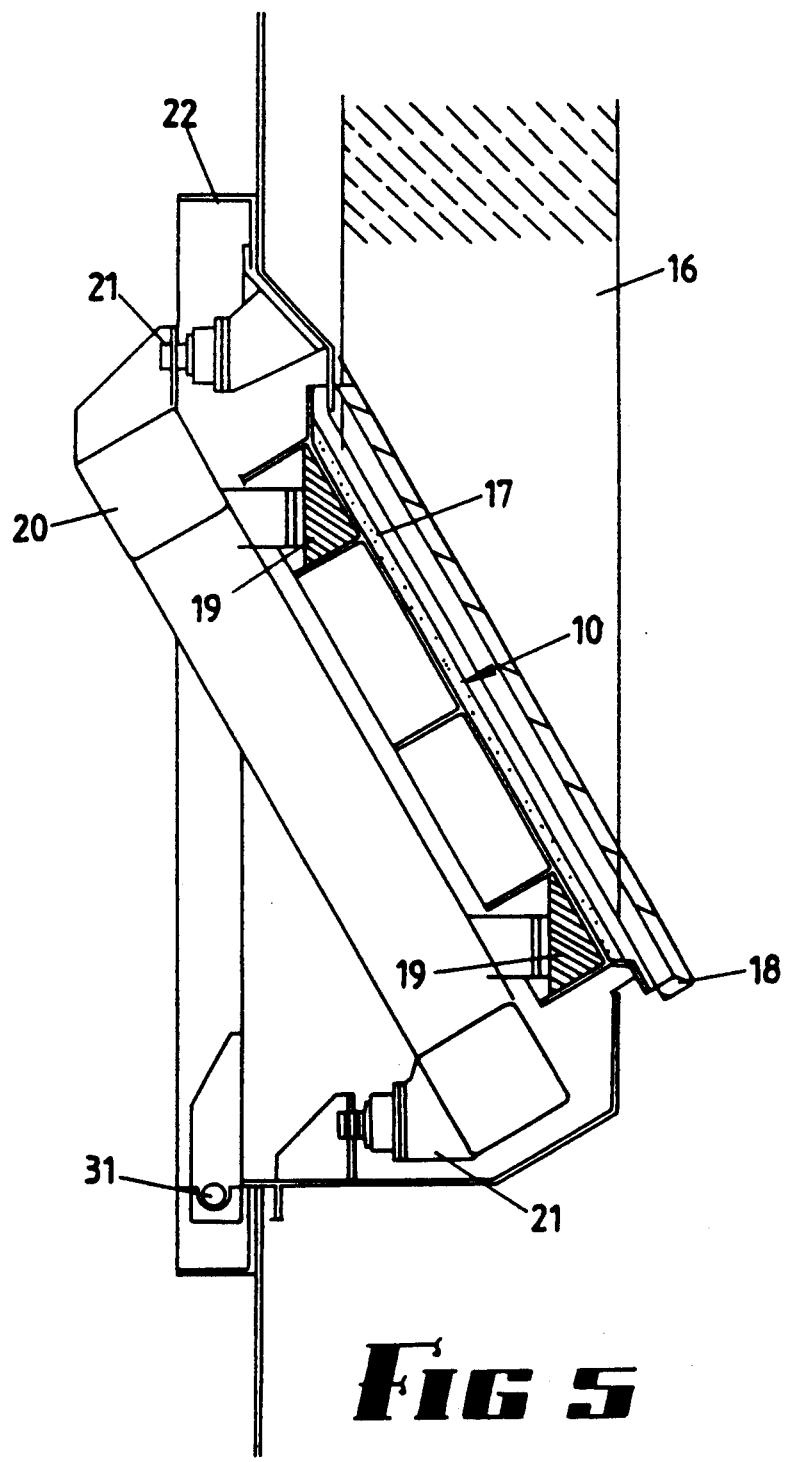

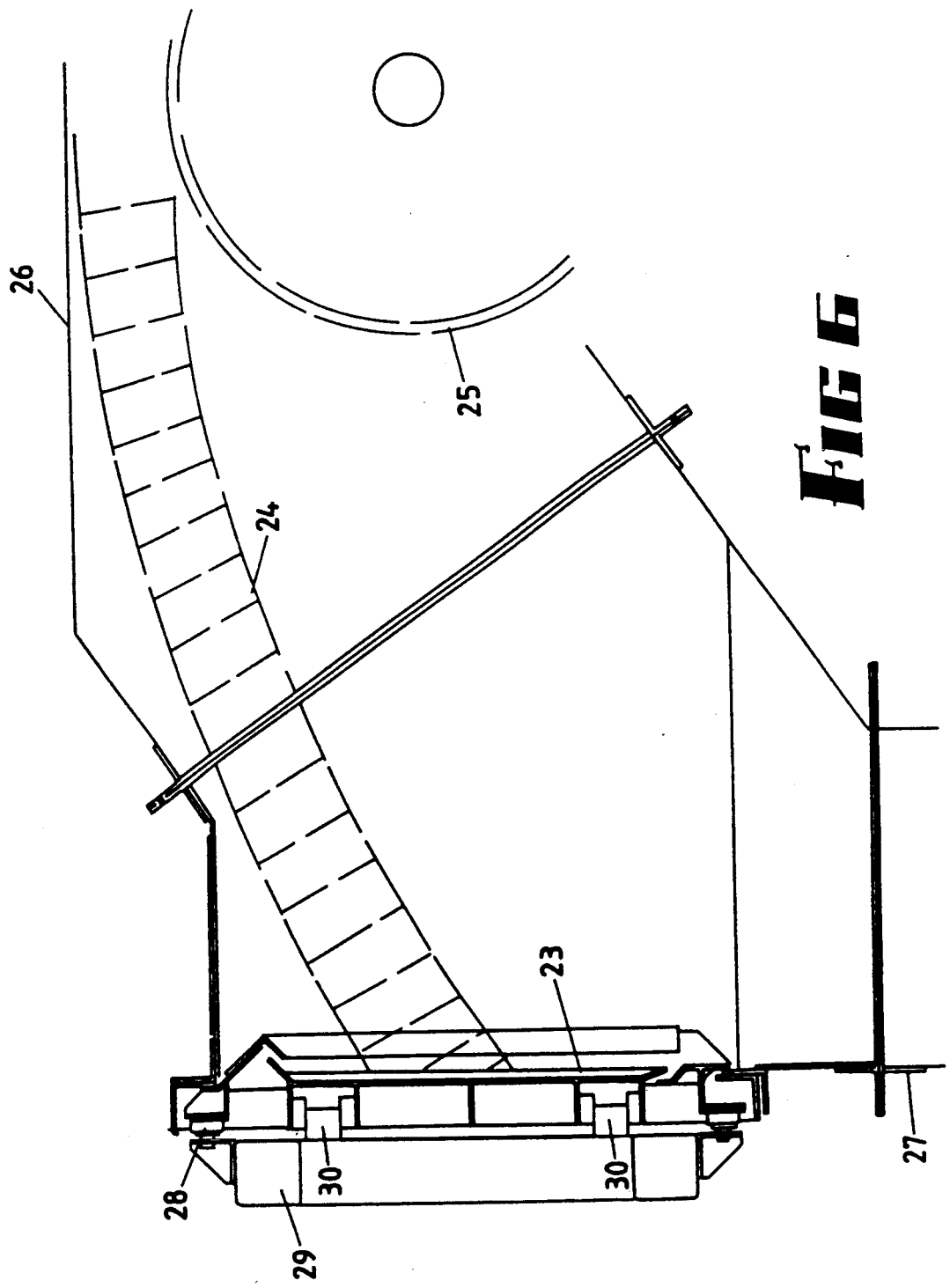

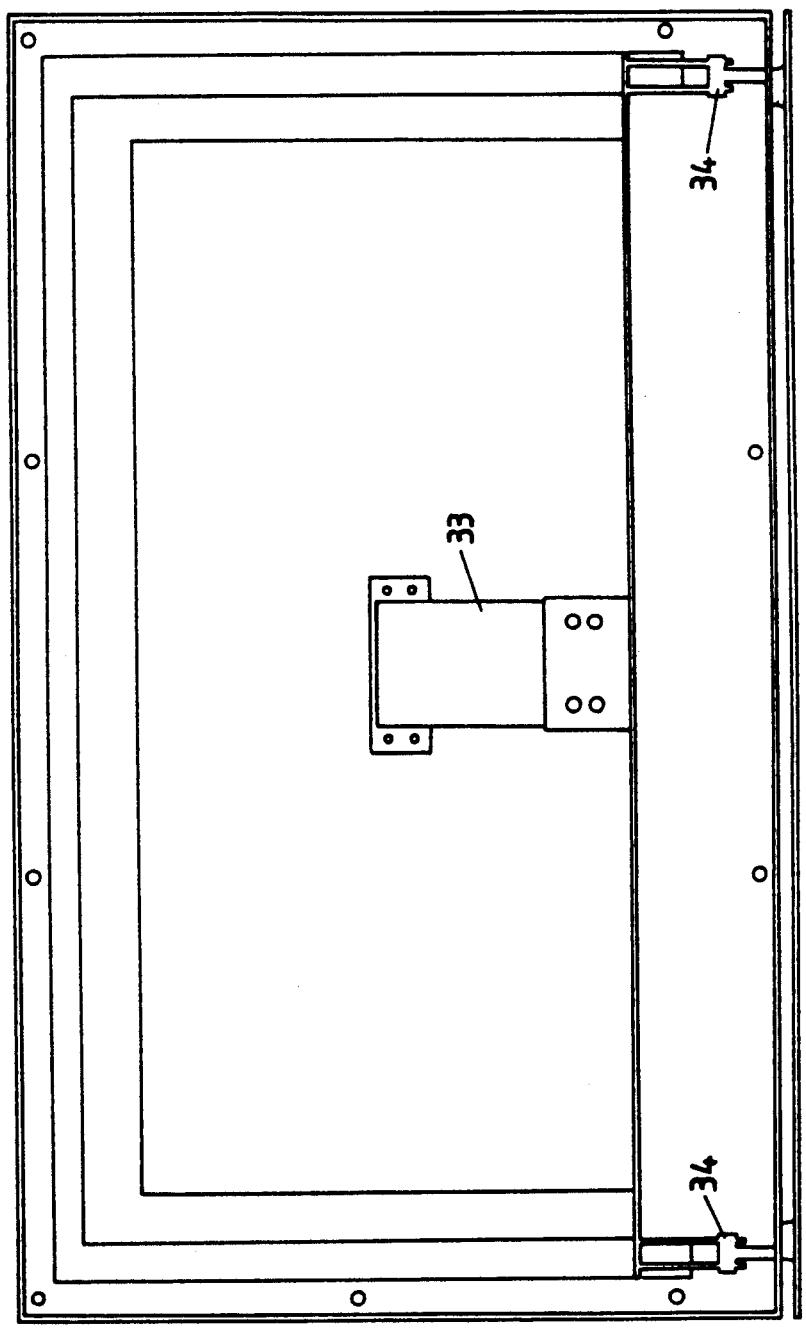
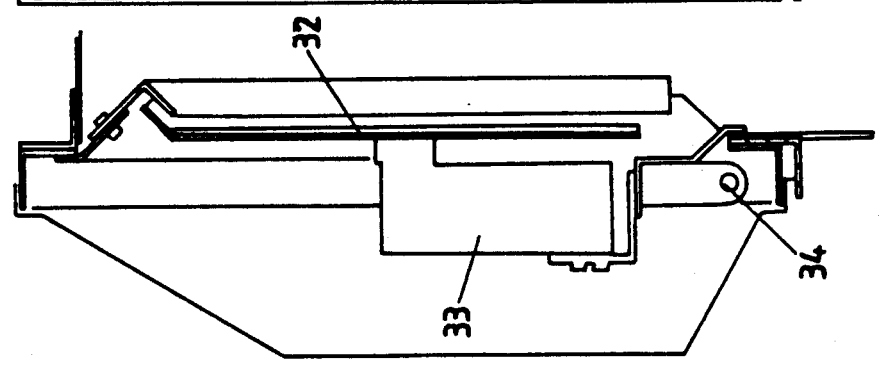

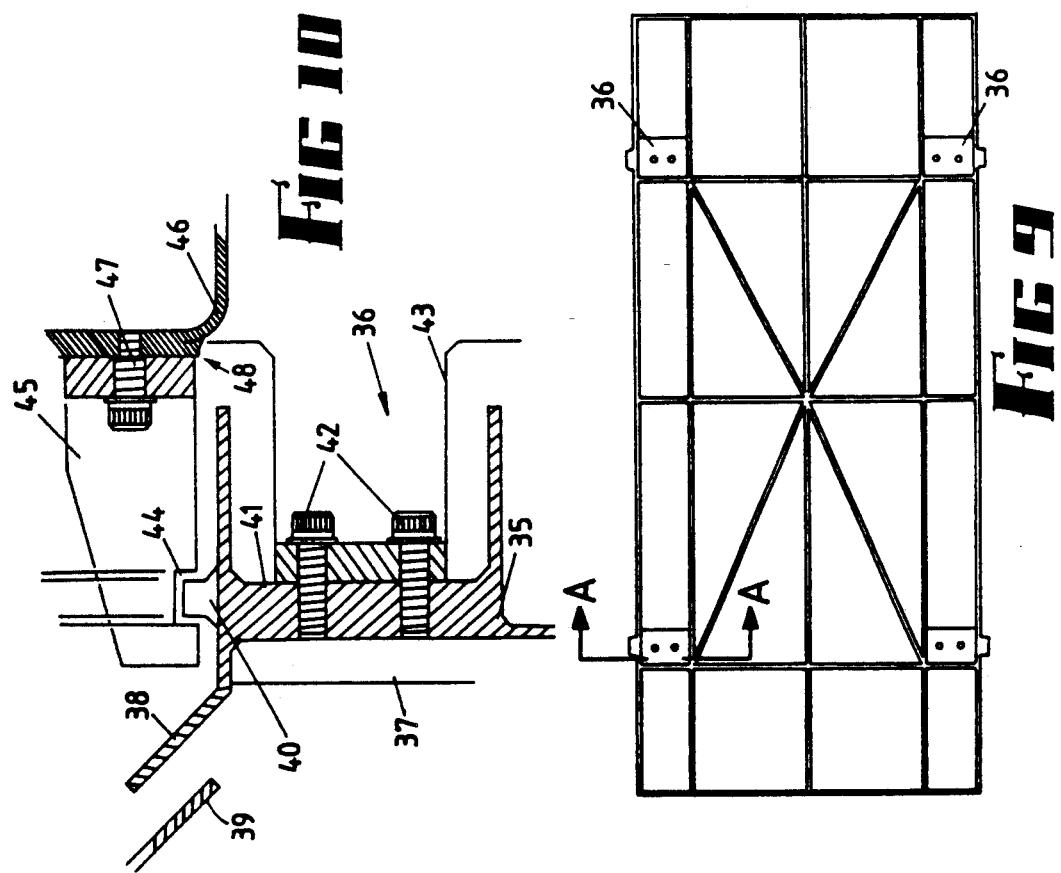

FLOW LINE WEIGHING DEVICE

This invention relates to a weighing device which is suitable for weighing fluent material, including liquids, slurries, powders, metal or the like.

BACKGROUND OF THE INVENTION

At the present time, the most commonly used flow line weighing material comprises an inclined sensing plate carried on the end of a pivoted arm which is coupled to a linear displacement transducer, and which moves in a lateral direction against a spring due to the horizontal component of force of the material impinging upon the sloping face. The linear displacement transducer (load cell) provides a read-out which is a function of the force against the plate.

There are some problems which are encountered however and which not only cause the product to be expensive but also to have accuracy which can be doubted in certain instances.

These difficulties include the lever arm effect, wherein an impingement against a portion of the inclined plate more removed from its support can give a different reading from an impingement on another portion which is closer to the support. Furthermore, the mounting is essentially an expensive arrangement requiring transfer of movement and force from the projecting arm which carries a plate to the inner arm within a cabinet which co-operates with the linear displacement transducer. The moving parts are critical and must be maintained in good condition so that there is no loss due to seized or partly seized parts. Because of the existence of moving parts reliability is not as high as with the arrangement to be described in this specification. The provision of a cabinet to one side of the plate interferes with available space as well as adding to cost.

DESCRIPTION OF THE PRIOR ART

One example of the prior art is shown in U.S. Pat. No. 4,440,029 which is directed to an impact flow meter, there being an inclined impact plate which in one embodiment is pivoted in a housing and connected to a force detector.

In another embodiment a vertical impact plate against which the material impinges at an angle, is supported by a strip spring, there being a piano wire connected to a lever contacting an impact force detector.

U.S. Pat. No. 3,530,714 discloses a target flow meter device, having a target in a fluid pipe, the target being connected to a force bar connected to a force measuring unit.

U.S. Pat. No. 4,063,456 shows a flow measuring unit for bulk material wherein the material impinges on a measuring box supported by springs which positions the box against a force measuring device.

Thus in all of the above there is a mechanism comprising levers, and/or springs or the like, for transmitting the force of reactions on the reaction plate or device to the force measuring unit. These are all subject to wear, and accumulation of material, dust and the like which can affect the ultimate reading of the force measuring device.

Small horizontal force components produce very small deflections and hence very small electrical outputs from transducer. Prior art uses expensive single transducer together with, in some instances, mechanical techniques for amplifying the horizontal force component, to overcome the problem of small forces. This results in high cost, susceptibility to mechanical problems and errors etc.

OBJECTS OF THE INVENTION

The principle object of the invention is to provide an impact flow meter of simple structure for measuring the mass flow rate of free-flowing particulate materials (powders, slurries, grains, metals, etc.) with an accuracy of better than ±0.5% of full range.

Other objects of the invention include:

1. To provide an impact flow meter that is free of mechanical errors associated with levers, pivots, etc.
2. To provide an impact flow meter that is unaffected by the location of material impact on the plate.
3. To provide an impact flow meter that incorporates within the framework of the device one or more inexpensive transducers for the measurement of the horizontal component of impact force.
4. To provide an impact flow meter whose accuracy is unaffected by the width of the impact plate.
5. To provide an impact flow meter that is unaffected by material build-up on the plate.
6. To provide an impact flow meter that automatically compensates for variations in zero offset during operation.
7. To provide an impact flow meter in which the calibration of the instrument can readily be carried out in-situ.
8. To provide an impact flow meter that is unaffected by variations in ambient temperature.

BRIEF DESCRIPTION OF THE INVENTION

In this invention, the mounting means comprises at least one force transducer which defines a plate area of plate, and an electronic circuit processes the signals developed by the horizontal component of force to provide a read-out which is additive and independent of the area of the plate which is impinged by the fluent material which is to be weighed.

An embodiment of the invention is described hereunder in some detail with reference to and as illustrated in the accompanying sketches, in which:

BRIEF DESCRIPTION OF THE DRAWINGS

FIG. 5 is a side elevation of a further form of the invention,

FIG. 6 shows a vertical sensing plate having a plurality of transducers,

FIG. 7 shows an end elevation of a vertical sensing plate with a single transducer, FIG. 8 is a side elevation of the rear of the plate of FIG. 7, FIG. 9 shows a side elevation of the rear of a further sensing plate, FIG. 10 is a cross section along the lines A—A of FIG. 9.

DESCRIPTION OF THE PREFERRED EMBODIMENT

Figure 1:
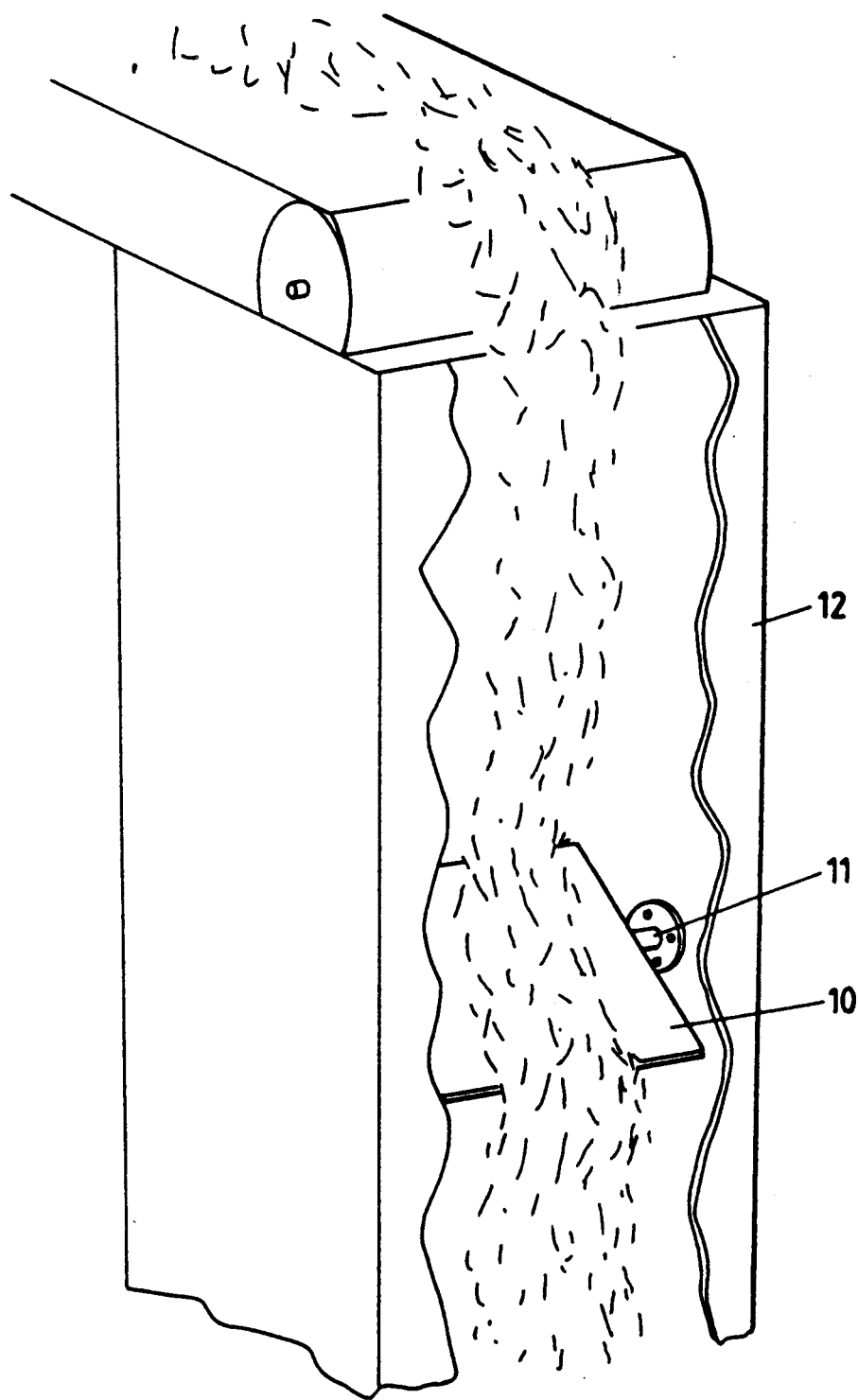
FIG. 1 shows diagrammatically the manner in which the device is used in relation to a conveyor.
Figure 2:
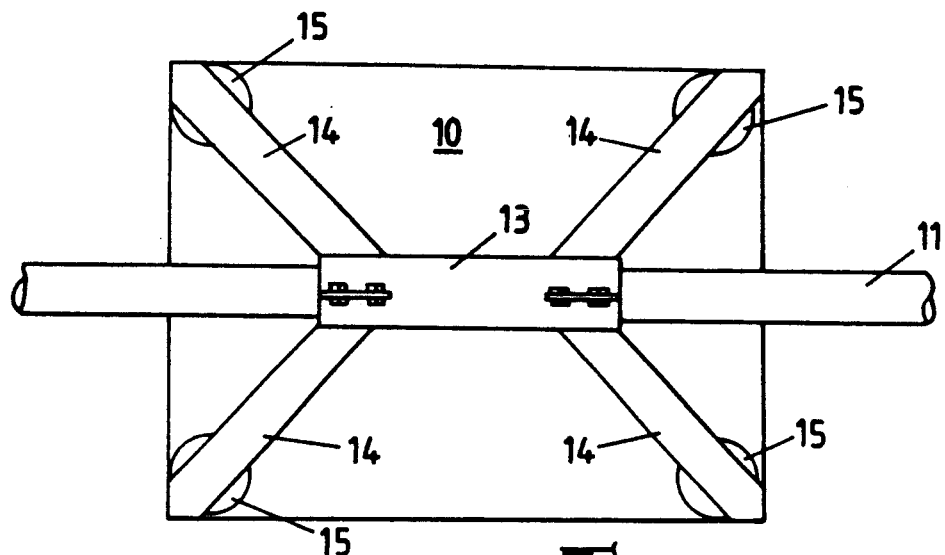
FIG. 2 shows a rear view of the plate.
Figure 3:
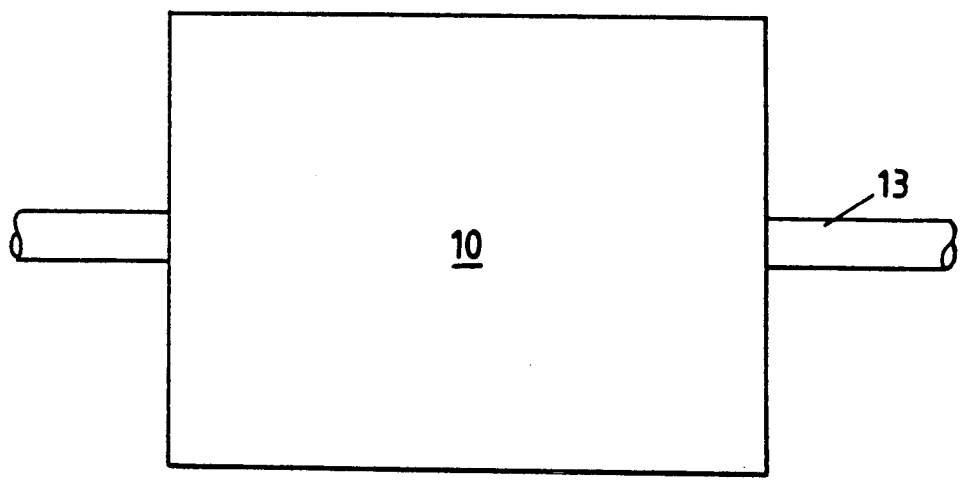
FIG. 3 shows a front view of the plate.
Figure 4:
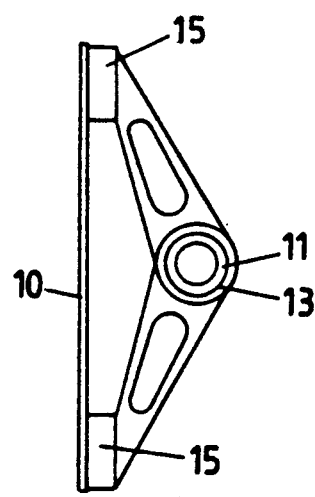
FIG. 4 shows a side view thereof.

In this embodiment, a flow line weighing device comprises an inclined plate 10 which is carried on a support bar 11 within a vertical chute 12, the support bar 11 having clamped to it a sleeve 13 with four diagonally extending arms 14 each of which is connected to a corner of the plate 10 through a load cell 15.

There are many types of transducers which are available, and most can be made use of in this invention.

The signals which are developed by the passage of electrical current through the transducers are additive, merely by placing the cells into series, such that the read-out reads the total horizontal force component due to the impact of the fluent material against the inclined face of the plate 10.

Referring now to FIG. 5, which shows the sensing plate 10 being inclined and positioned to intercept the material flow 16 falling vertically, the sensing plate being covered by a wear resistant facing of polyurethane 17, in a protective surround 18.

The sensing plate has four measuring transducers 19 (only two of which are shown) in contact with the sensing plate, the transducers being mounted in a transducer frame 20. The frame 20 is supported by three vibration isolation mounts 21 to a base frame 22.

The three vibration isolation mounts 21 are located one at the centre top of the transducer frame 20 and one at each lower corner of the transducer frame 20. The base frame 22 is mounted in a hinge 31 so that the sensing assembly can be swung downward to a horizontal position for calibration.

FIG. 6 shows a vertical sensing plate 23 having a construction similar to that of FIG. 5, but mounted vertically to intercept the trajectory of the material 24 from a belt conveyor 25 in an adaptor housing 26, the material passing downwardly from the sensing plate 23 through a valve 27.

Again the unit comprises isolation mountings 28, transducer frame 29 and transducers 30.

Turning now to FIG. 7, this shows an embodiment where the sensing plate 32 has a single sensing transducer module 33 mounted centrally on the sensing plate 32, the whole unit again being mounted on a pivot 34 so that it can be swung downwardly to a horizontal position for calibration.

FIG. 9 shows the rear of a sensing plate 35, the plate having movement limiting devices 36. FIG. 10 shows in cross-section along the lines A—A of FIG. 9 one of these movement limiting devices 36.

The plate 35 has a polyurethane facing 37, a guide flange 38 co-operating with a supply duct flange 39 (not shown in full) and an outstanding lip 40 formed on the edge of the plate on a thickened portion 41 of the plate. This thickened portion provides a mounting area for studs 42 to support a rear plate 43.

The lip 40 is received in a recess 44 formed in a member 45 mounted on the base frame 46 by a stud 47, shims 48, being positioned as desired to correctly position the lip 40 in the centre of the recess 44. Thus in the example there is provision for a 2 mm movement in each direction, and any further movement is limited by the lip 40 engaging the respective side wall of the recess 44.

Figure 11:
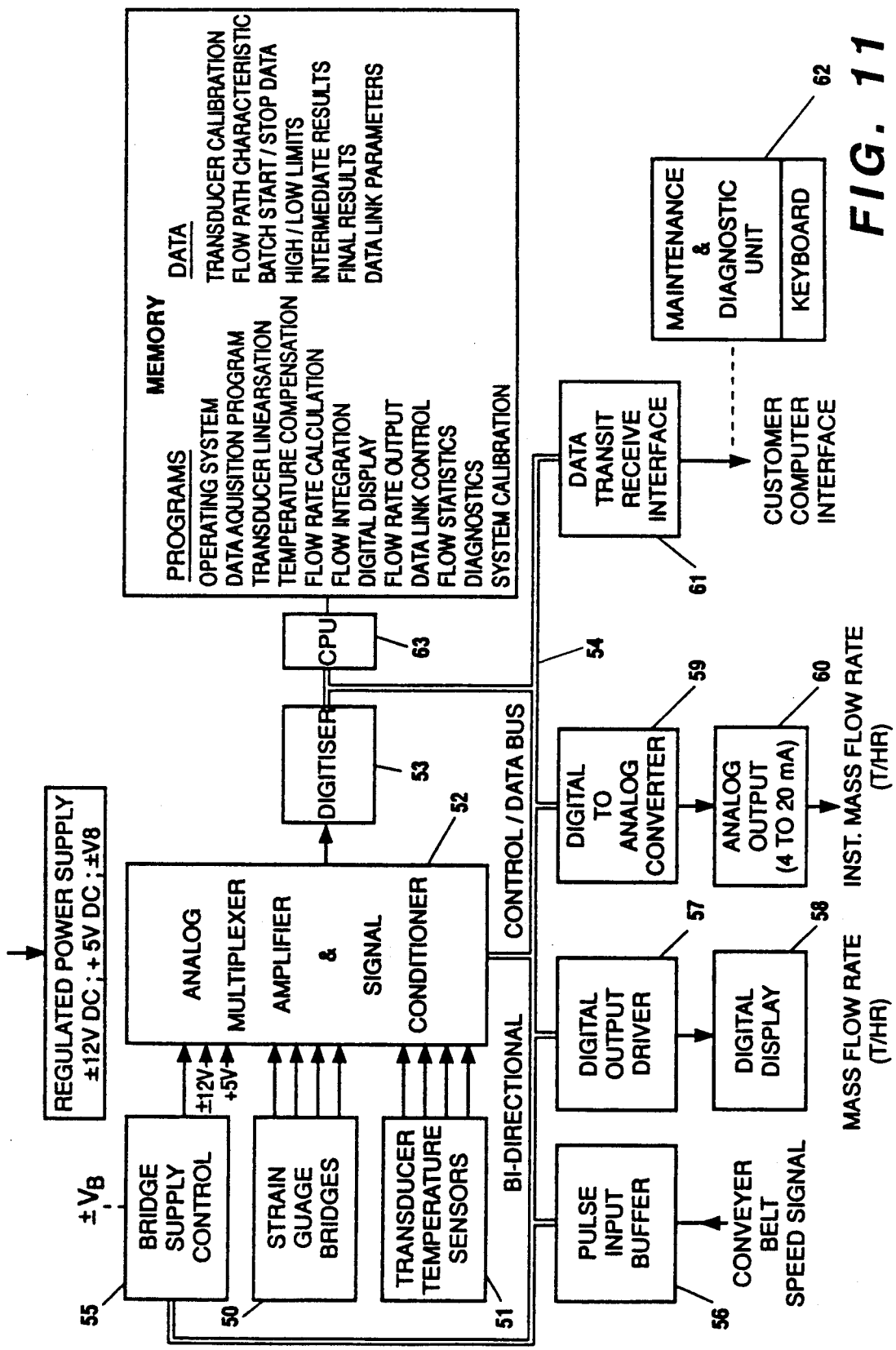
FIG. 11 is a block diagram of an electrical circuit for processing the signals from the transducers.

FIG. 11 shows a block diagram of the circuit for processing the signals from the force sensing units or strain gauges. The output from the strain gauge bridges 50 together with the transducer temperature sensors 51 are fed to an analog multiplexer amplifier and signal conditioner 52 the output of which passes to a digitiser 53.

A bi-directional control/data bus 54 connects a bridge supply control 55 a pulse input buffer 56, a digital output driver 57 and digital display 58, a digital to analog converter 59 and analog output 60 to give an instantaneous mass flow rate (for example in tonnes per hour), a data transmit-receive interface 61 connected to a maintenance and diagnostic keyboard 62.

The bus 54 also is connected to the digitiser 53 and to a CPU 63.

Referring to the embodiment shown in FIG. 5 the principle of operation is as follows:

The force of impact as a function of mass flow can be calculated as follows:

$$F = m \times a = Qm \times V$$

where
F = force, kg m/s$^2$
m = mass, kg
a = acceleration, m/s$^2$
Qm = mass flow rate, kg/s
V = velocity, m/s
Impact Force = f(Mass flow rate, impact velocity)
Mass Flow Rate = f(Depth of grain on conveyor belt, speed of conveyor, density of grain)
Impact Velocity = f(Speed of conveyor, position of impact w.r. to conveyor head pulley [i.e. trajectory of grain after leaving the conveyor until impact], acceleration due to gravity, windage effects)
Horizontal Component of Impact Force = f(Impact Force, Angle of impact plate)

Thus for a given conveyor belt speed, geometry of installation, particle size and angle of impact plate the horizontal component of impact force is a function of mass flow rate, i.e. variations in the depth of grain on the conveyor belt and variations in the density of grain will cause variations in the measurement of mass flow rate for a given belt speed.

Variations in belt speed may be measured and used to compute a belt speed correction factor which may be applied to the measurement of the horizontal component of impact force by consideration of the effect that variation in belt speed has on impact velocity together with consideration of the effect that variation in impact velocity has on impact force.

The electrical signal is a function of the impact force, viz:

Transducer output signal = f(Horizontal component of impact force, ambient temperature, other factors related to the transducer design and construction.)

Each transducer may be tested independently prior to assembly to determine the relationship between transducer output and load over the range of temperatures for which the instrument is required to operate.

Where only one transducer is used to measure the impact force the output signal from the single transducer may be used in conjunction with measured temperature and the pre-determined transducer load-temperature characteristics to compute the force that gave rise to the transducer output. This process is called Temperature Compensation and Linearisation.

Where two transducers are used to measure the impact force the output signal from each transducer may be used in conjunction with the measured temperature of each transducer and the pre-determined transducer load-temperature characteristics to compute the force that would have given rise to such transducer output if considered in isolation from the other transducer.

Where the transducers are located so as to support the impact plate then to the extent that each transducer is mechanically identical to the other, the load applied to the impact plate will be shared equally between the two transducers. Thus the force computed for each transducer after Temperature Compensation and Linearisation must be halved.

The two force components (one from each transducer) may then be summed to obtain the force that was exerted on the impact plate.

Where N transducers, mechanically identical are used to support the plate in such a way as to distribute the load equally between them then the above procedure for two transducers may be extrapolated to N.

Experiments have indicated that the invention is exceedingly simple and overcomes many of the difficulties which have been encountered with previous arrangements. The readings have proved to be accurate for a wide range of materials including powdered and pulverised materials having particle sizes ranging from fine powders to quarried materials, slurries including pumped coal and wet concrete, fluids, fixed shape manufactured items such as nuts, bolts and the like, wood chips as may be used in the particle board industry, stock feeds, sand and gravel and grain. Since there are no moving parts, the cost is low and the design can be heavy duty. If required, the load cells can be protected by spring means which collapse upon excessive load being applied, and the mounting can be varied to include torsion rod mounting to improve discrimination or bending plate mounting.

The transducers are so oriented that they measure only the horizontal components of force, the vertical components not providing any signal. Thus any stationary fluent material is not recorded, and consequential build up errors are automatically avoided and this avoids the need for commonly used correction devices.

I claim:

1. A flow line weighing device for weighing flowable material, the device comprising a non-horizontal plate having a front surface against which the flowable material impinges, characterized in that the plate is supported solely by a plurality of force transducers attached to and in direct contact with the rear surface of the plate, and an electronic circuit to process signals from said force transducers developed by the horizontal component of the impinging force to provide a read-out independent of the area of the front surface of the plate which is impinged by the fluent material being weighed.

2. A flow line weighing device as defined in claim 1, in which said plate is inclined to the vertical to be impinged by vertically falling flowable material.

3. A flow line weighing device as defined in claim 1 in which said plate is vertical to be impinged by material projected from a conveyor.

4. A flow line weighing device as defined in claim 1 in which said plate is rectangular and has said force transducers mounted one at each corner of said plate, said transducers being supported by a transducer frame.

5. A flow line weighing device as defined in claim 1 wherein said force transducers are in contact with said plate, said force transducers being mounted in a transducer frame, a base frame supporting said transducer frame, a pivot connecting said base frame to a support whereby said base frame may be swung to a horizontal position with said plate facing upwardly for calibration of said transducers.

6. A flow line weighing device as defined in claim 1, wherein the output signals from each said force transducer are applied to an analog multiplexer amplifier and signal conditional which also receives signals from temperature sensors associated with each force transducer.

7. A flow line weighing device as defined in claim 6, wherein a bidirectional control/data bus is connected to a pulse input buffer responsive to the speed of a belt conveyor which conveys the flowable material, and to a digitiser receiving signal from the analog multiplexer amplifier and signal conditioner and to a central processing unit, together with a digital output driver giving a display of the mass flow rate.

* * * * *